US006915344B1

(12) United States Patent
Rowe et al.

(10) Patent No.: US 6,915,344 B1
(45) Date of Patent: Jul. 5, 2005

(54) SERVER STRESS-TESTING RESPONSE VERIFICATION

(75) Inventors: Michelle M. Rowe, Hesperus, CO (US); Matthew C. Odhner, Woodinville, WA (US); Michael W. Thomas, Bellevue, WA (US); Boyd C. Multerer, Seattle, WA (US); Tom A. Cox, Bothell, WA (US); Eric W. Nace, Fairbanks, AK (US)

(73) Assignee: Microsoft Corporation, Redmond, WA (US)

( * ) Notice: Subject to any disclaimer, the term of this patent is extended or adjusted under 35 U.S.C. 154(b) by 937 days.

(21) Appl. No.: 09/626,710

(22) Filed: Jul. 27, 2000

(Under 37 CFR 1.47)

Related U.S. Application Data (60) Provisional application No. 60/168,137, filed on Nov. 30, 1999.

(51) Int. Cl.[7] ............................................. G06F 15/173
(52) U.S. Cl. ....................................... 709/224; 709/219
(58) Field of Search ................................. 709/224, 219, 709/220, 223; 345/179; 705/26; 713/176, 170, 200, 181; 714/4, 46, 39; 707/209; 370/252; 340/825

(56) References Cited

U.S. PATENT DOCUMENTS

| | | | | |
|---|---|---|---|---|
| 6,044,398 A | * | 3/2000 | Marullo et al. | 709/219 |
| 6,367,017 B1 | * | 4/2002 | Gray | 713/200 |
| 6,425,004 B1 | * | 7/2002 | Hardjono | 709/223 |
| 6,425,081 B1 | * | 7/2002 | Iwamura | 713/176 |
| 6,446,120 B1 | * | 9/2002 | Dantressangle | 709/224 |
| 6,516,413 B1 | * | 2/2003 | Aratani et al. | 713/170 |
| 6,523,115 B1 | * | 2/2003 | Ono et al. | 713/181 |
| 6,581,093 B1 | * | 6/2003 | Verma | 709/220 |

OTHER PUBLICATIONS

An Investigation of Documents from the World Wide Web— Woodruff, Aoki, Brewer..(1996); epoch.cs.berkeley.edu:8000/postgres/papers/www5–docs.ps.Z.*

MiMi: A Java Implementation of the MicroMint Scheme— Hassler, Bihlmeyer..(1997) ;www.infosys.tuwien.ac.at/Staff/vh/papers/mimi/mimi.ps.gz.*

Supporting Cooperative and Personal Surfing with a Desktop..—Marais, Bharat (1997); ftp.digital.com/pub/DEC/SRC/publications/marais/uist97paper.ps.*

* cited by examiner

*Primary Examiner*—Thong Vu
(74) *Attorney, Agent, or Firm*—Lee & Hayes, PLLC (57) ABSTRACT

A network test system utilizes known good responses when testing responses from in-test servers. In one embodiment, the test system includes a verification server that is known to provide correct responses. In-test servers are subjected to very high rates of requests, and the responses are compared to responses from the verification server. Hash values are optionally used to represent the correct responses, and are compared to similar hash values produced from the actual responses of the in-test servers. Dynamic data is accommodated by basing the hash values on only the static portions of responses. Alternatively, dynamic data is accommodated by using search patterns—when receiving an actual response from an in-test server, the response is searched for the specified search pattern. The response is deemed to be incorrect if the search pattern does not occur. Wildcards and other variable elements are used in the search patterns.

25 Claims, 4 Drawing Sheets

Fig. 4

SERVER STRESS-TESTING RESPONSE VERIFICATION

RELATED APPLICATIONS

This application claims the benefit of U.S. Provisional Application No. 60/168,137, filed Nov. 30, 1999, entitled "Web Server Automated Stress Verification."

TECHNICAL FIELD

This invention relates to automated stress testing of servers such as public Internet servers.

BACKGROUND

The Internet, a vast public data and communications network, is becoming more and more important to both individuals and businesses. The Internet comprises a huge number of individual network nodes. Many of these nodes are consumers of information. Other nodes might also supply small amounts of information. Still other nodes are primarily suppliers or servers of information. The invention concerns the testing of such server systems.

Although there are many different Internet information providers, a few have become quite significant. For example, there are relatively few widely used search engines, and the available search engines process very high numbers of search requests. So-called "portals" comprise another category of information providers that have become prominent. Such providers deliver a variety of different information, often referring (or "linking") users to other providers for the actual information.

The numbers of data requests or "hits" processed by these relatively few but prominent Internet nodes is staggering. As an example, the Microsoft family of Internet sites logs well over a billion hits daily.

The Internet uses a client/server model in which client software—known as a Web browser—runs on a local computer. Client machines effect transactions with Web servers using Hypertext Transfer Protocol (HTTP), which is a known application protocol providing users with access to files (e.g., text, graphics, images, sound, video, etc.). Returned data is formatted in accordance with pre-defined protocols, such as HTML, XML data, XML schemas, etc.

In the Internet paradigm, a network path to a server is identified by a so-called Uniform Resource Locator (URL) having a special syntax for defining a network connection. Use of an HTTP-compatible browser (e.g., Microsoft Internet Explorer) at a client machine involves specifying a link via the URL. In response, the client makes a request to the server identified in the link and receives in return a document formatted according to HTML. The Web server is usually a standalone file server or a server farm that services various Web document requests.

One of the problems that has arisen, and one which is particularly illustrated in the context of the highly prominent Internet sites mentioned above, is that information providers often need to scale their operations so that they are able to service high rates of requests without sacrificing reliability. One way of doing this is to incorporate multiple servers into a networked system. A collection of servers such as this is sometime referred to as a server "farm." Each of the individual servers operates identically in order for the same services and responses to be rendered regardless of which server is used to render the services and responses.

It should be noted that many servers are doing much more than simply returning static text and graphics. Rather, many of the more popular Internet sites accept user-supplied information and dynamically compile responses based on the supplied information. This information often comes from sources other than the server itself, such as from a database server or even an image server that provides continuously updated images. Furthermore, requested data such as a weather forecast might change with time.

The reliability of both server software and hardware is very important in this environment. However, it is becoming increasingly difficult to effectively test highly scaled web server systems. A simple testing approach is to simply submit a few requests to the server system and manually verify that the responses are correct. However, it is now recognized that it is necessary to "stress test" server systems: to place them under a very heavy load of requests and to verify that the responses are correct when operating under this load.

When attempting to perform server testing at this level, it becomes necessary to automatically check whether responses are correct rather than manually verifying the content of each response. In the prior art, this is done by checking the headers of the responses. Each header contains a numeric "reply status" that indicates whether the server believes it has provided a correct response. Thus, incorrect responses are detected in the prior art by checking their reply status indicators.

The inventors have found shortcomings in this approach, and have devised more effective methods of verifying the correctness of responses during stress testing.

SUMMARY

The methods and systems described below do not rely on the response header to verify correctness of a response. Rather, correct responses are compiled and compared with actual responses to detect any incorrect actual responses. In one embodiment, the correct responses are obtained from a verification server—a server that has been proven with time to provide correct responses. The responses can be obtained and cached prior to testing, or can be obtained on-the-fly as testing proceeds.

In one embodiment, the correct responses are represented by hash values, and are compared to hash values generated from the actual responses. This allows caching of a larger variety of correct responses. In another embodiment, correct responses are represented by data patterns that contain variable data (such as search strings containing wildcards). To verify the correctness of an actual response, the actual response is searched for the presence (or absence) of the data pattern.

In some situations, responses contain portions that change with time. In these situations, only static portions of the correct and actual responses are compared. The use of hashes and data patterns is also useful in these situations. For example, the hashes can be computed from only those portions of the responses that are known to be static. Similarly, a data pattern can explicitly specify static portions of a response, while representing dynamic portions with wildcards.

DETAILED DESCRIPTION

Figure 1:
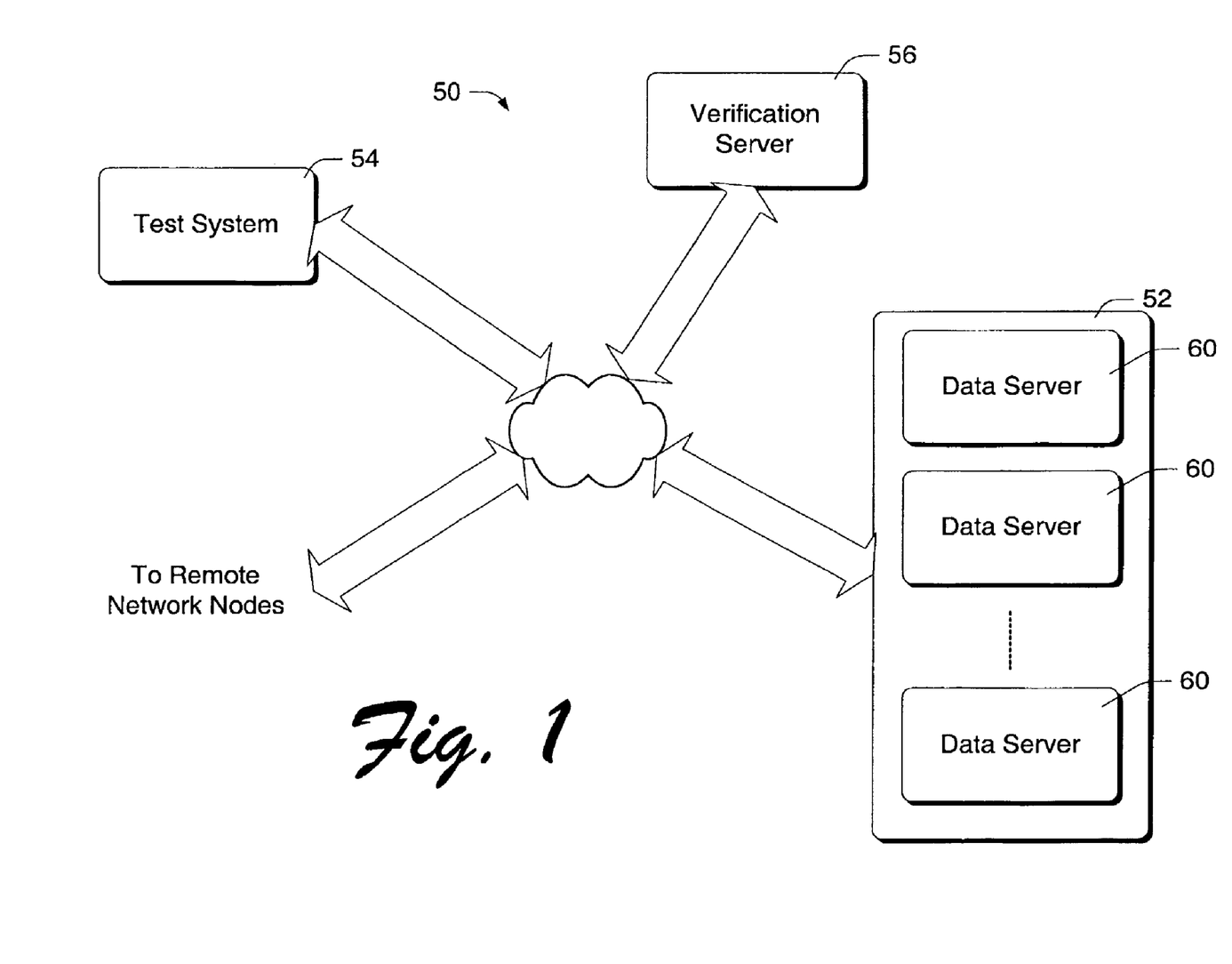
FIG. 1 is a block diagram of a network system.

FIG. 1 shows a system 50 comprising a public network server system 52, a test system 54, and one or more optional verification servers 56 that are used in some embodiments of the invention. These components are connected for high-speed data communications using networking technology such as is commonly used in local area networks, wide area networks, and the public Internet.

The public network server system 52 comprises a plurality of data servers 60 that accept requests from large numbers of remote network clients (not shown). The data servers provide responses comprising data that potentially includes graphically formatted HTML information pages, XML data, XML schemas, XML nodes, VMRL data, PDF files, generated XML or other types of data.

Test system 54 comprises one or more computers that formulate and submit test requests at a very high rate to one or more of data servers 60, referred to herein as "in-test" servers. The test system receives actual responses from the in-test servers and examines them to determine whether they are correct. This determination is made by compiling or caching correct responses to the requests, from verification servers 56, and comparing the correct responses to the actual responses.

Verification servers 56 are servers that have already been proven to provide reliably correct responses to requests. For example, these servers might be running a previous version of server software, known to be reliable. This previous version is used to verify correct operation of a newer version under extreme loads.

In some embodiments of the invention, the verification servers are used during testing as a source of correct responses, rather than pre-caching correct responses. The verification servers accept the same test requests that have been submitted to the in-test servers, and dynamically generate and provide correct responses for comparison to the actual responses from the in-test servers.

Also, it should be noted that the verification server can in some embodiments be part of the test system 54—the verification server might be a software component running on the same hardware that performs other test functions.

Exemplary Computer Environment

Figure 2:
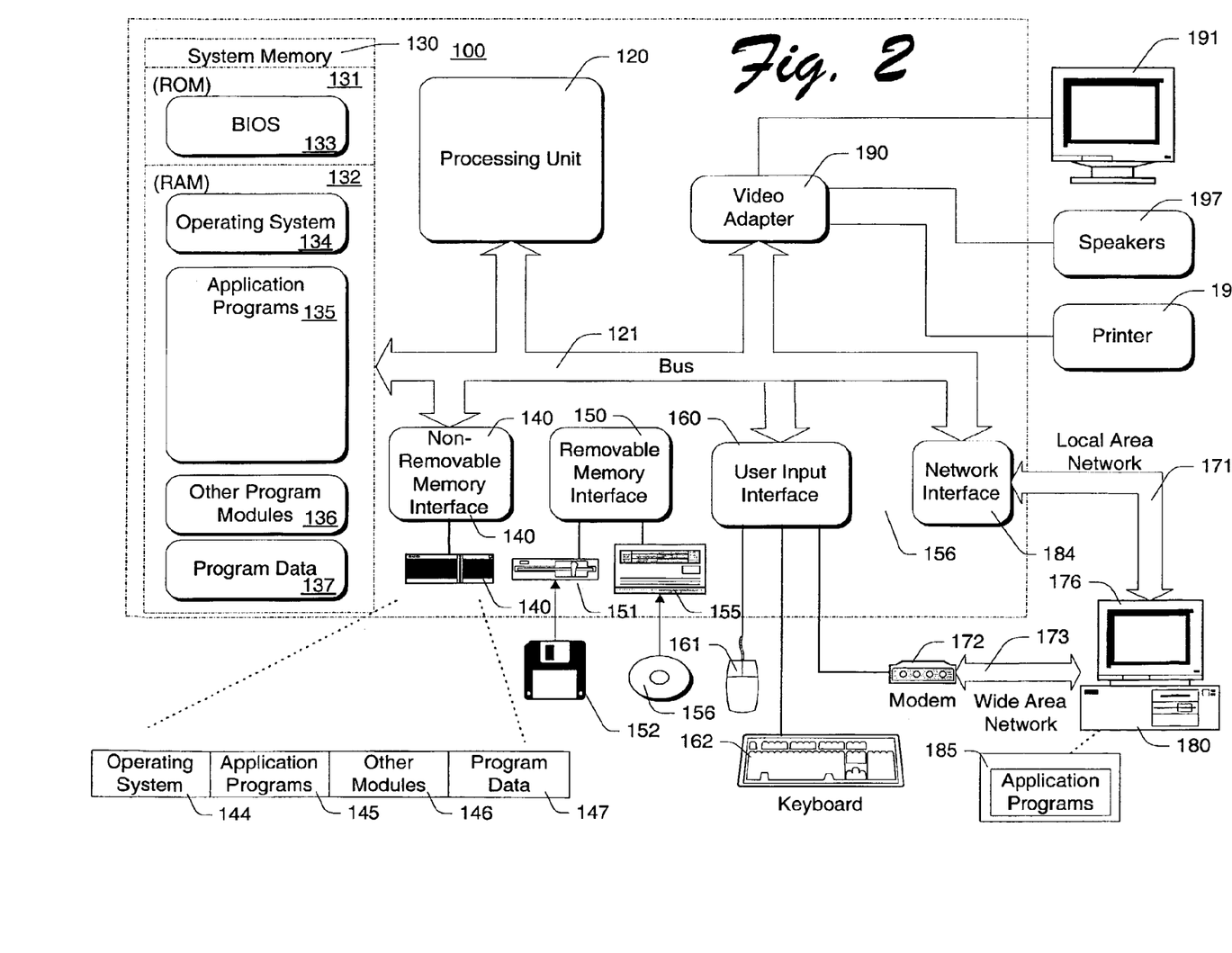
FIG. 2 is a block diagram of an exemplary computer system.

The various components and functionality of FIG. 1 are implemented with a number of individual computers. FIG. 2 shows components of typical example of such a computer, referred by to reference numeral 100. The components shown in FIG. 2 are only examples, and are not intended to suggest any limitation as to the scope of the functionality of the invention; the invention is not necessarily dependent on the features shown in FIG. 2.

Generally, various different general purpose or special purpose computing system configurations can be used. Examples of well known computing systems, environments, and/or configurations that may be suitable for use with the invention include, but are not limited to, load balanced server farms and load balanced server farms acting as a single entity, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 2, the components of computer 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 100 typically includes a variety of computer-readable media. Computer-readable media can be any available media that can be accessed by computer 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 100, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 100 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface such as interface 150.

The drives and their associated computer storage media discussed above and illustrated in FIG. 2 provide storage of computer-readable instructions, data structures, program modules, and other data for computer 100. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 100 through input devices such as a keyboard 162 and pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer may operate in a networked environment using logical connections to one or more remote computers, such as a remote computer 180. The remote computer 180 may be a personal computer, a server, a router, a network PC, a peer device or other common network node, and typically includes many or all of the elements described above relative to computer 100, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 100 is connected to the LAN 171 through a network interface or adapter 170. When used in a WAN networking environment, the computer 100 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 100, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Test System

As noted above, current stress testing technology checks response headers to determine whether a server has responded properly to a request. However, the inventors have found that this method of testing is not sufficient. Specifically, the inventors have found cases where the status code of the response header indicates success, while the body of the response contains incorrect data. This can happen, for example, when the server successfully formulates and sends a response, but contains data from a back-end database server that is responding incorrectly. In many cases, there is no automated way of detecting this situation.

Figure 3:
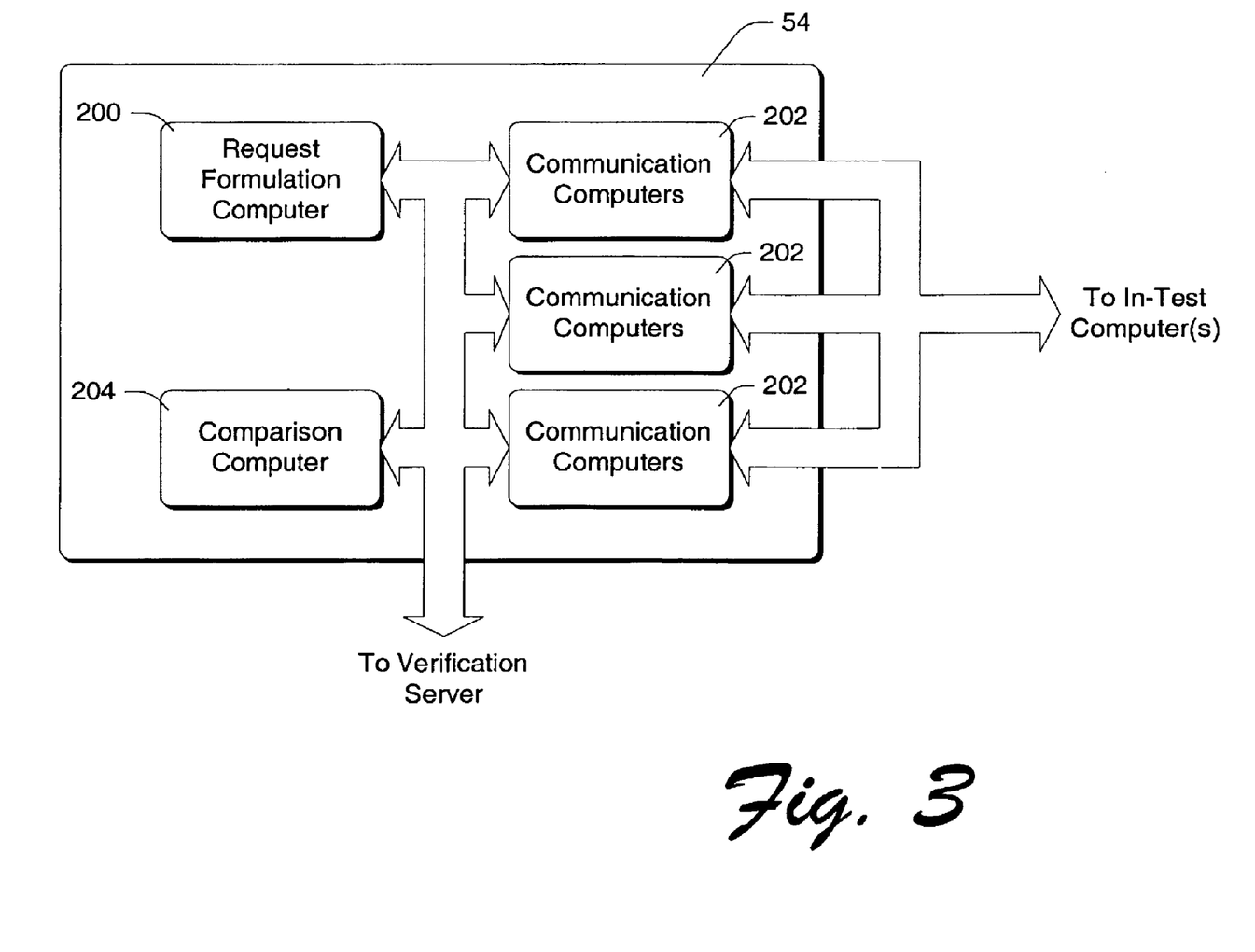
FIG. 3 is a block diagram of a test system.

FIG. 3 shows details of test system 54 for stress testing a public network server system, wherein the public network server system comprises a plurality of data servers as shown in FIG. 1 that accept requests from large numbers of remote network clients and that provide responses to such requests. The responses comprise graphically formatted information pages or other data in formats such as HTML, XML, XML schema, etc.

Test system 54 includes a request formulation computer 200 that generates HTTP test requests for submissions to the in-test data servers. Such requests can include both properly formed and/or improperly formed requests.

Test system 54 further includes a plurality of communication computers 202 that send test requests and receive actual responses from the data servers. The communication computers receive the pre-formulated requests from the request formulation computer 200 and submit them at very high rates to the in-test servers.

In the described embodiment, communication between the request formulation computer 200 and the communication computers 202 may take place on a different network or network segment than used for communications between communication computers 202 and the in-test data servers 60 (FIG. 1). This is to preserve the highest possible bandwidth availability between communication computers 202 and the in-test servers, so that very high rates of test requests can be submitted to the in-test servers.

Either prior to or concurrently with sending the test requests to the in-test servers, the same test requests are also sent to verification server 56—again using a separate network or network segment if possible.

Test system 54 may also include a comparison computer 204 that compares the actual responses from in-test servers 56 with the correct responses from verification server 56. More specifically, the communication computers 202 receive actual responses from the in-test servers and corresponding correct responses from the verification server, and routes these responses to the comparison computer 204. Comparison computer 154 compares the actual responses and the corresponding correct responses to determine whether the actual responses—or relevant portions of the responses—are identical. This comparison identifies any incorrect actual responses.

Preferably, a plurality of correct responses are cached for access by the comparison computer. This reduces the load on the verification server.

In one embodiment, correct responses are represented by hash values. In this embodiment, the actual responses are hashed, and the resulting hash values are compared with the hash values of the correct responses to determine whether the actual responses contain errors.

In another embodiment, correct responses are represented by search patterns. In this embodiment, the actual responses are search for the presence of the specified search patterns to determine whether the actual responses contain errors.

Different embodiments utilize different hardware configurations and divisions of responsibilities. For example, it might be possible in some embodiments to use a single computer for performing the tasks of request formulation computer 200, comparison computer 204, and the communication computers 202. Furthermore, the verification server might be implemented on one or more of the computers of test system 54, such as on comparison computer 204.

Methodological Aspects

Figure 4:
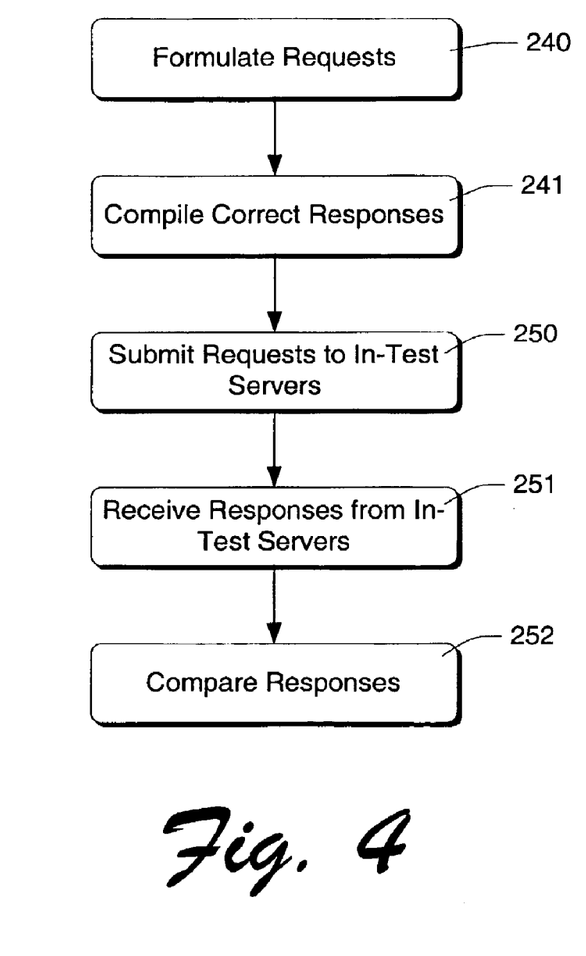
FIG. 4 is a flowchart showing preferred methodological elements.

FIG. 4 illustrates methodological elements performed in the environment described above. A preparatory action 240 comprises pre-formulating requests that will be cached and eventually submitted to the in-test servers. An action 241 comprises compiling correct responses to the requests. These responses can be cached along with the pre-formulated requests. Alternatively, the correct responses can be created or obtained on the fly, contemporaneously with receiving the actual responses from the in-test servers.

One way to obtain correct responses is for a person to manually verify the correctness of a number of individual responses, and store these responses as the desired or "correct" responses. More desirably, this action involves submitting the formulated requests to verification server 56, and then receiving and caching the correct responses that are received from the verification server. Actions 240 and 241 are preparatory steps, although they are preferably repeated during the course of testing to make sure that the responses contain up-to-date data. Furthermore, in some embodiments it might be desirable to formulate requests during real time, as testing proceeds, and to verify and cache correct responses (or response hashes—see below) either as the requests are formulated or as actual responses are received from the in-test servers.

In some embodiments, the verification server might be implemented by one of the computers of test system 54, such as comparison computer 204. In this case, the verification server exists as a software element that executes on comparison computer 204, and correct responses are received from this software element. Comparison computer 204 might also perform other functions such as those of request formulation computer 200 and communication computers 202.

An action 250 comprises submitting a high rate of requests to the in-test servers. These requests are the same requests formulated in action 240.

Action 251 comprises receiving actual responses from the in-test data servers. These responses, along with the correct responses received from the verification server, are passed to comparison algorithms, which may be running on a separate computer such as comparison computer 204. Alternatively, the correct responses might be pre-cached, and retrieved by the comparison computer as needed.

Comparison computer 204 performs an action 252 of comparing the actual responses from the data servers and the correct responses from the verification server, to identify correct and incorrect actual responses from the data servers. In a simplified embodiment, the comparison computer checks that the two responses have equal lengths, and then does a string or a byte comparison of the responses to ensure that there is a match.

Hashing

The described method involves a relatively large overhead relating to storing the correct responses from the verification server and comparing them with the actual responses. Since the validity of the testing relies on being able to test many different requests and responses, this overhead becomes critical.

The overhead can be reduced by pre-computing and storing hashes of the correct responses, and computing hashes of the actual responses as they are received. The hashes are pass ed to the comparison computer, which merely compares the hashes to determine if the actual response matches the correct response. Many different algorithms are known and available for producing acceptable hashes from arbitrary data . The important characteristic of such hashing algorithms is that they repeatedly produce the same hash value when operating on the same data, but produce a different hash value if the data varies in any way. The size of the hash value can be fixed, either during system design or at runtime when the amount of data to be read can be predicted. Alternatively, the hash size can be allowed to grow dynamically as data is received. A well-known algorithm referred to as the MD5 cryptographic hash algorithm is an example of an acceptable hash algorithm.

Using hashes to represent responses allows a large volume of verified content, preferably provided by the verification server, to be hashed on demand and then used to verify the responses of an in-test server. This allows the use of many different requests and responses, which increases the validity of the testing.

Dynamic Data

One potential problem with the scheme described above arises in the context of responses that contain both static and dynamic data. Static data is data that remains constant with time. Dynamic data is data that potentially changes with time—from one request to the next. Any comparisons made to validate these response are likely to fail because of the dynamic nature of at least portions of the data.

This potential problem is overcome in one embodiment by identifying static portions of the responses, and comparing only those static portions. Thus, static data in a correct response from a verification server is identified and delimited. Identification of the static portions is usually a manual process (performed by a human), but can also be automated. For example, the verification server can identify static data with reference to the source files upon which responses are based.

When using hashing, only the static portions of the responses are operated on by the hashing algorithm. The static data portions of a response from the verification server are operated on by the hashing algorithm to produce the hash value representing the correct response. Similarly, the same static portions are used from the actual responses to generate hashes. These hashes are compared to detect errors in actual responses.

Pattern Matching

Dynamically generated data can alternatively be accommodated by using a pattern matching technique. Using this technique, keyword-based or character-based search patterns are specified, corresponding to the desired responses for different requests. These search patterns specify data that is known to occur in static portions of the correct responses. The data patterns include the specification of variable data—data that is known to be dynamic. Such variable data is typically represented by wildcards. For example, the "*" character is used to represent any arbitrary string of characters. Other wildcards can be used to represent individual characters. The search patterns can also specify more complex relationships, such as specifying that two different data strings occur within a given number of characters from each other.

Examples of simple search patterns:

"200 O*"—a string that starts with '200 O', followed by any series of letters up to a delimiting token character (typically a space or white space character.

"*ing"—any word ending in 'ing'.

"S??per"—any word that starts with 'S', followed by any two characters, and ending with 'per'.

"David, Jones"—the exact string 'David, Jones'.

"The quick brown fox jumps over the old dog"—the exact phrase.

The examples above are not exhaustive—other examples and techniques are also contemplated.

As actual responses are received from the in-test server, they are subjected to a search for any specified patterns. If they contain the specified patterns, the responses are deemed correct. Otherwise, the responses are identified as being erroneous. Alternatively, inverted logic might be used to ensure that a specified phrase is not found within an actual response. In other words, an actual response is deemed correct only if it does not contain a specified pattern.

Pattern matching techniques may also include additional features, such as:

Designating the number of occurrences of a pattern that must (or must not) occur.

Designating that a word must (or must not) occur within a given number of words of another word or phrase.

Allowing the computation of search patterns by computational components such as program modules.

Specify wherein the response to begin the search (useful to ignore the response headers).

One advantage of the pattern matching technique is that it does not require a cache of known good responses. Instead, correct responses from a verification server are analyzed to formulate appropriate search patterns. Again, this is normally a manual or human process, but can be automated by referencing the source files used by the verification server.

This method is sometimes faster than computing a hash value, and can also give more concise feedback regarding errors by highlighting specific mismatches.

Other Comparison Techniques

The technique described above utilizes a comparison between a known good response and a response from an in-test server. Hashing and pattern matching are examples of ways this comparison can be efficiently implemented. Other comparison techniques might alternatively be used.

For example, an alternative method of comparison involves compressing the known good response and the in-test server response (or portions of the responses), and comparing the compressed versions of the responses. This reduces the amount of data that needs to be stored and compared. One way to implement such compression is to remove white space and/or HTML tags.

Another method is to perform a binary comparison between the verification data and the actual response data—rather than a string comparison. This is useful hen working with encrypted pages. In this case, it is desirable to use the "memcmp" utility to make the comparison.

These techniques might conceivably be used in conjunction with the other techniques, such as hashing, described above.

Conclusion

The described techniques provide comprehensive and high-load testing of network servers, in a way that has not previously been contemplated.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method of automated load stress testing, comprising:

submitting a high rate of requests to an in-test server;

receiving actual responses from the in-test server;

submitting the requests to a verification server;

receiving correct responses from the verification server; and comparing the actual responses from the in-test server and the correct responses from the verification server to identify incorrect actual responses from the in-test server.

2. A method as recited in claim 1, further comprising:

computing hashes of the actual responses;

computing hashes of the correct responses; and wherein the comparing comprises comparing the hashes of the actual responses and the hashes of the correct responses.

3. A method as recited in claim 1, further comprising:

storing hashes of the correct responses from the verification server;

computing hashes of the actual responses; and wherein the comparing comprises comparing the hashes of the actual responses and the pre-computed stored hashes of the correct responses.

4. A method of automated load stress testing, comprising:

formulating requests for submission to an in-test server;

compiling correct responses to the requests;

submitting the requests to the in-test server;

receiving actual responses from the in-test server; and comparing the correct responses to the actual responses to identify incorrect responses from the in-test server.

5. A method as recited in claim 4, wherein the compiling comprises obtaining correct responses to the requests from a verification server other than the in-test server.

6. A method as recited in claim 4, wherein the compiling comprises manually verifying the correct responses.

7. A method as recited in claim 4, wherein:
the requests are for both static data and dynamic data; and
the comparing comprises determining whether the actual responses contain identified static data in the correct responses.

8. A method as recited in claim 4, wherein:
the correct responses are represented by data patterns that include variable data;
the comparing comprises searching within the actual responses for the data patterns.

9. A method as recited in claim 4, wherein:
the correct responses are represented by hash values; and
the comparing comprises computing hash values of the actual responses and determining whether they match the hash values of the correct responses.

10. One or more computer-readable media containing one or more programs for stress testing a public network server system, wherein the public network server system comprises a plurality of data servers that accept requests from large numbers of remote network clients and that provide responses comprising graphically formatted information pages or other data, the one or more programs comprising instructions that are executable by a computer to perform acts comprising:
submitting a high rate of test requests to one or more of the data servers to obtain actual responses;
submitting the requests to a verification server to obtain correct responses; and
comparing the actual responses and the correct responses to identify incorrect actual responses from the data servers.

11. One or more computer-readable media as recited in claim 10, the acts further comprising:
computing hashes of the actual responses;
computing hashes of the correct responses; and
wherein the comparing comprises comparing the hashes of the actual responses and the hashes of the correct responses.

12. One or more computer-readable media as recited in claim 10, the acts further comprising:
pre-computing and storing hashes of the correct responses from the verification server;
computing hashes of the actual responses; and
wherein the comparing comprises comparing the hashes of the actual responses and the pre-computed stored hashes of the correct responses.

13. One or more computer-readable media containing one or more programs for stress testing a public network server system, wherein the public network server system comprises a plurality of data servers that accept requests from large numbers of remote network clients and that provide responses comprising graphically formatted information pages or other data, the one or more programs comprising instructions that are executable by a computer to perform acts comprising:
identifying requests for both static data and dynamic data;
identifying static data contained in correct responses to the requests;
submitting a high rate of the requests to at least one of the data servers;
receiving actual responses from the data servers; and
determining whether the actual responses contain the identified static data to identify incorrect responses from the data servers.

14. One or more computer-readable media containing one or more programs for stress testing a public network server system, wherein the public network server system comprises a plurality of data servers that accept requests from large numbers of remote network clients and that provide responses comprising graphically formatted information pages or other data, the one or more programs comprising instructions that are executable by a computer to perform acts comprising:
identifying test requests;
specifying data patterns representing data contained in correct responses to the test requests, wherein the specified data patterns include variable data;
submitting a high rate of the test requests to at least one of the data servers;
receiving actual responses from the data servers; and
searching within the actual responses for the specified data patterns to identify incorrect responses from the data servers.

15. One or more computer-readable media containing one or more programs for stress testing a public network server system, wherein the public network server system comprises a plurality of data servers that accept requests from large numbers of remote network clients and that provide responses comprising graphically formatted information pages or other data, the one or more programs comprising instructions that are executable by a computer to perform acts comprising:
identify test requests;
pre-computing hashes of data contained in correct responses to the requests;
submitting a high rate of the test requests to at least one of the data servers;
receiving actual responses from the data servers; and
comparing hashes of the pre-computed hashes and the of data contained in the actual request to identify incorrect responses from the in-test server.

16. One or more computer-readable media as recited in claim 15, wherein:
at least some of the correct responses include both static and dynamic data; and
the hashes are computed from only the static data.

17. A system comprising:
a public network server system having a plurality of data servers that accept requests from large numbers of remote network clients and that provide responses comprising data that potentially includes graphically formatted information pages;
one or more verification servers that accept requests and provide correct responses;
a test system networked with the public network server system and the one or more verification servers, the test system being configured to perform acts comprising:
submitting a high rate of requests to one or more of the data servers;
receiving actual responses from the data servers;
submitting the requests to the one or more verification servers;
receiving correct responses from the verification servers; and
comparing the actual responses from the data servers and the correct responses from the verification servers to identify incorrect actual responses from the data servers.

18. A system as recited in claim 17, the test system being configured to perform further acts comprising:
   computing hashes of the actual responses;
   computing hashes of the correct responses; and
   wherein the comparing comprises comparing the hashes of the actual responses and the hashes of the correct responses.

19. A system as recited in claim 17, the test system being configured to perform further acts comprising:
   pre-computing and storing hashes of the correct responses from the verification server;
   computing hashes of the actual responses; and
   wherein the comparing comprises comparing the hashes of the actual responses and the pre-computed stored hashes of the correct responses.

20. A system comprising:
   a public network server system having a plurality of data servers that accept requests from large numbers of remote network clients and that provide responses comprising data that potentially includes graphically formatted information pages;
   a test system networked with the public network server system and the one or more verification servers, the test system being configured to perform acts comprising:
   formulating test requests;
   compiling correct responses to the requests;
   submitting a high rate of the test requests to one or more of the data servers;
   receiving actual responses from the one or more data servers; and
   comparing the correct responses to the actual responses to identify incorrect responses from the in-test server.

21. A system as recited in claim 20, wherein the compiling comprises obtaining correct responses to the requests from a verification server other than the in-test server.

22. A system as recited in claim 20, wherein the compiling comprises manually verifying the correct responses.

23. A system as recited in claim 20, wherein:
   the test requests are for both static data and dynamic data; and
   the comparing comprises determining whether the actual responses contain identified static data in the correct responses.

24. A system as recited in claim 20, wherein:
   the correct responses are represented by data patterns that include variable data;
   the comparing comprises searching within the actual responses for the data patterns.

25. A system as recited in claim 20, wherein:
   the correct responses are represented by hash values; and
   the comparing comprises computing hash values of the actual responses and determining whether they match the hash values of the correct responses.

* * * * *